(12) United States Patent
Yamafuji

(10) Patent No.: US 10,454,117 B2
(45) Date of Patent: Oct. 22, 2019

(54) FUEL CELL MOUNTING STRUCTURE

(71) Applicant: TOYOTA JIDOSHA KABUSHIKI KAISHA, Toyota-shi, Aichi-ken (JP)

(72) Inventor: Takahiro Yamafuji, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 15/257,416

(22) Filed: Sep. 6, 2016

(65) Prior Publication Data

US 2017/0133691 A1    May 11, 2017

(30) Foreign Application Priority Data

Nov. 5, 2015 (JP) ................. 2015-217720

(51) Int. Cl.
| | |
|---|---|
| H01M 8/02 | (2016.01) |
| H01M 8/04 | (2016.01) |
| H01M 8/2465 | (2016.01) |
| H01M 8/04029 | (2016.01) |
| H01M 8/04007 | (2016.01) |
| H01M 8/04082 | (2016.01) |
| H01M 8/04858 | (2016.01) |
| B60L 3/00 | (2019.01) |
| H01M 8/247 | (2016.01) |
| B60L 50/72 | (2019.01) |

(52) U.S. Cl.
CPC ............ *H01M 8/02* (2013.01); *B60L 3/0015* (2013.01); *B60L 50/72* (2019.02); *H01M 8/04* (2013.01); *H01M 8/04029* (2013.01); *H01M 8/04067* (2013.01); *H01M 8/04201* (2013.01); *H01M 8/04917* (2013.01); *H01M 8/247* (2013.01); *H01M 8/2465* (2013.01); *B60L 2270/145* (2013.01); *H01M 2250/20* (2013.01); *Y02T 90/32* (2013.01); *Y02T 90/34* (2013.01)

(58) Field of Classification Search
None
See application file for complete search history.

(56) References Cited

U.S. PATENT DOCUMENTS

| | | | |
|---|---|---|---|
| 6,223,843 B1 * | 5/2001 | O'Connel | F02B 43/10 |
| 6,479,180 B1 * | 11/2002 | Uozumi | H01M 8/02 |
| | | | 429/469 |
| 2007/0215397 A1 | 9/2007 | Suzuki | |
| 2009/0133943 A1 | 5/2009 | Noguchi et al. | |
| 2012/0006606 A1 | 1/2012 | Masaki et al. | |

(Continued)

FOREIGN PATENT DOCUMENTS

| | | |
|---|---|---|
| CN | 104114396 A | 10/2014 |
| JP | 2006-089040 A | 4/2006 |

(Continued)

*Primary Examiner* — Haroon S. Sheikh
(74) *Attorney, Agent, or Firm* — Oliff PLC

(57) ABSTRACT

There is provided a fuel cell mounting structure including (i) a fuel cell which is configured to be disposed in a vehicle where a drive motor that drives rear wheels is placed in a vehicle rear portion, the fuel cell placed on the vehicle upper side of a suspension member disposed in a vehicle front portion and connected via a plurality of anti-vibration members to the suspension member, and (ii) auxiliaries that are attached to the fuel cell in a state in which the auxiliaries do not contact the suspension member and include at least an air compressor and a pump.

5 Claims, 4 Drawing Sheets

(56) References Cited

U.S. PATENT DOCUMENTS

| | | |
|---|---|---|
| 2015/0027796 A1 | 1/2015 | Naito et al. |
| 2016/0039464 A1* | 2/2016 | Hirano .................. B62D 21/11 180/312 |
| 2016/0368358 A1 | 12/2016 | Nagaosa |

FOREIGN PATENT DOCUMENTS

| | | |
|---|---|---|
| JP | 2007-245954 A | 9/2007 |
| JP | 2009-126452 A | 6/2009 |
| JP | 2009-190438 A | 8/2009 |
| JP | 2015-157609 A | 9/2015 |
| WO | 2012/004828 A1 | 1/2012 |
| WO | 2013/118602 A1 | 8/2013 |

* cited by examiner

FUEL CELL MOUNTING STRUCTURE

CROSS-REFERENCE TO RELATED APPLICATION

This application claims priority under 35 USC 119 from Japanese Patent Application No. 2015-217720 filed on Nov. 5, 2015, the disclosure of which is incorporated by reference herein.

BACKGROUND

Technical Field

The present disclosure relates to a fuel cell mounting structure.

Related Art

As a vehicle having an on-board fuel cell, Japanese Patent Application Laid-open (JP-A) No. 2006-89040 discloses a configuration where the fuel cell is placed under a front seat. Furthermore, in JP-A No. 2006-89040, the vehicle is equipped with a pair of drive motors for driving the front wheels, and auxiliaries that become sources of vibration, such as a hydrogen gas circulation pump, are placed between the pair of drive motors so that vibration generated by the auxiliaries is damped via the heavy-weight motors.

In this connection, if the technology disclosed in JP-A No. 2006-89040 were applied to a rear-wheel-drive fuel cell vehicle, the drive motors would become placed in the vehicle rear portion. However, if the auxiliaries are moved to the vehicle rear portion together with the drive motors, the distance between the auxiliaries and the parts in the vehicle front portion, such as the radiator and the condenser, becomes longer, so there is the potential for costs associated with the wires and piping of the auxiliaries to increase.

SUMMARY

The present disclosure obtains a fuel cell mounting structure which, in a rear-wheel-drive fuel cell vehicle, can damp vibration of the auxiliaries while suppressing an increase in costs associated with the wires and piping of the auxiliaries.

A first aspect of the present disclosure is a fuel cell mounting structure including a fuel cell which is configured to be disposed in a vehicle and auxiliaries. In a vehicle where a drive motor that drives rear wheels is placed in a vehicle rear portion, the fuel cell is placed on the vehicle upper side of a suspension member disposed in a vehicle front portion and is connected via plural anti-vibration members to the suspension member. The auxiliaries are attached to the fuel cell in a state of in which the auxiliaries do not contact the suspension member and include at least an air compressor and a pump.

In the first aspect, the rear wheels are driven by the drive motor placed in the vehicle rear portion. Furthermore, the fuel cell is placed on the vehicle upper side of the suspension member in the vehicle front portion, and the fuel cell is connected via the plural anti-vibration members to the suspension member. Here, the auxiliaries, which are configured to include the air compressor and the pump, are attached to the fuel cell, and the auxiliaries are placed in a state in which the auxiliaries do not contact the suspension member. In this way, by attaching the auxiliaries to the heavy-weight fuel cell, vibration generated by the auxiliaries can be damped via the fuel cell. Furthermore, at least some of the vibration of the fuel cell can be absorbed by the anti-vibration members.

Moreover, by placing the auxiliaries in the vehicle front portion, the wires and piping of the auxiliaries do not have to be made longer, and an increase in costs associated with the wires and piping can be suppressed. Moreover, in the event of a collision to the vehicle, some of the collision load is absorbed by the anti-vibration members, so the collision load can be kept from being transmitted to the fuel cell.

A second aspect of the present disclosure is the fuel cell mounting structure of the first aspect, wherein an air conditioning system compressor is attached to the fuel cell in a state in which the air conditioning system compressor does not contact the suspension member.

In the second aspect, in addition to the auxiliaries for the fuel cell vehicle, the air conditioning system compressor is attached to the fuel cell, so vibration generated by the air conditioning system compressor can be damped via the fuel cell.

A third aspect of the present disclosure is the fuel cell mounting structure of the first or second aspect, wherein at least one of a DC-DC converter or an inverter is attached to the fuel cell in a state in which the at least one of the DC-DC converter or the inverter does not contact the suspension member.

In the third aspect, in addition to the auxiliaries for the fuel cell vehicle, at least one of a DC-DC converter and an inverter is attached to the fuel cell, so in-cabin noise caused by high frequencies generated by the DC-DC converter and/or the inverter can be damped via the fuel cell.

A fourth aspect of the present disclosure is the fuel cell mounting structure of any one of the first to third aspects, wherein the anti-vibration members are connected to a stack frame that supports the fuel cell, and the auxiliaries are attached via the stack frame to the fuel cell and are placed in positions where they are hidden by the stack frame as seen from the vehicle upper direction.

In the fourth aspect, the auxiliaries are placed in positions where they are hidden by the stack frame as seen from the vehicle upper direction. For this reason, even in the case of appropriating parts such as a suspension member and a chassis of a conventional vehicle whose only drive source is an engine, the auxiliaries can be kept from interfering with these parts.

As described above, according to the first aspect of the present disclosure, in a rear-wheel-drive fuel cell vehicle, vibration of the auxiliaries can be damped while suppressing an increase in costs associated with the wires and piping of the auxiliaries.

According to the second or third aspect, vibration generated by the air conditioning system compressor and in-cabin noise caused by high frequencies generated by the DC-DC converter and/or the inverter can be reduced without the need to dispose dedicated anti-vibration members.

According to the fourth aspect, parts can be shared with those of a conventional vehicle.

BRIEF DESCRIPTION OF THE DRAWINGS

An exemplary embodiment of the present disclosure will be described in detail based on the following figures, wherein.

DETAILED DESCRIPTION

Figure 1:
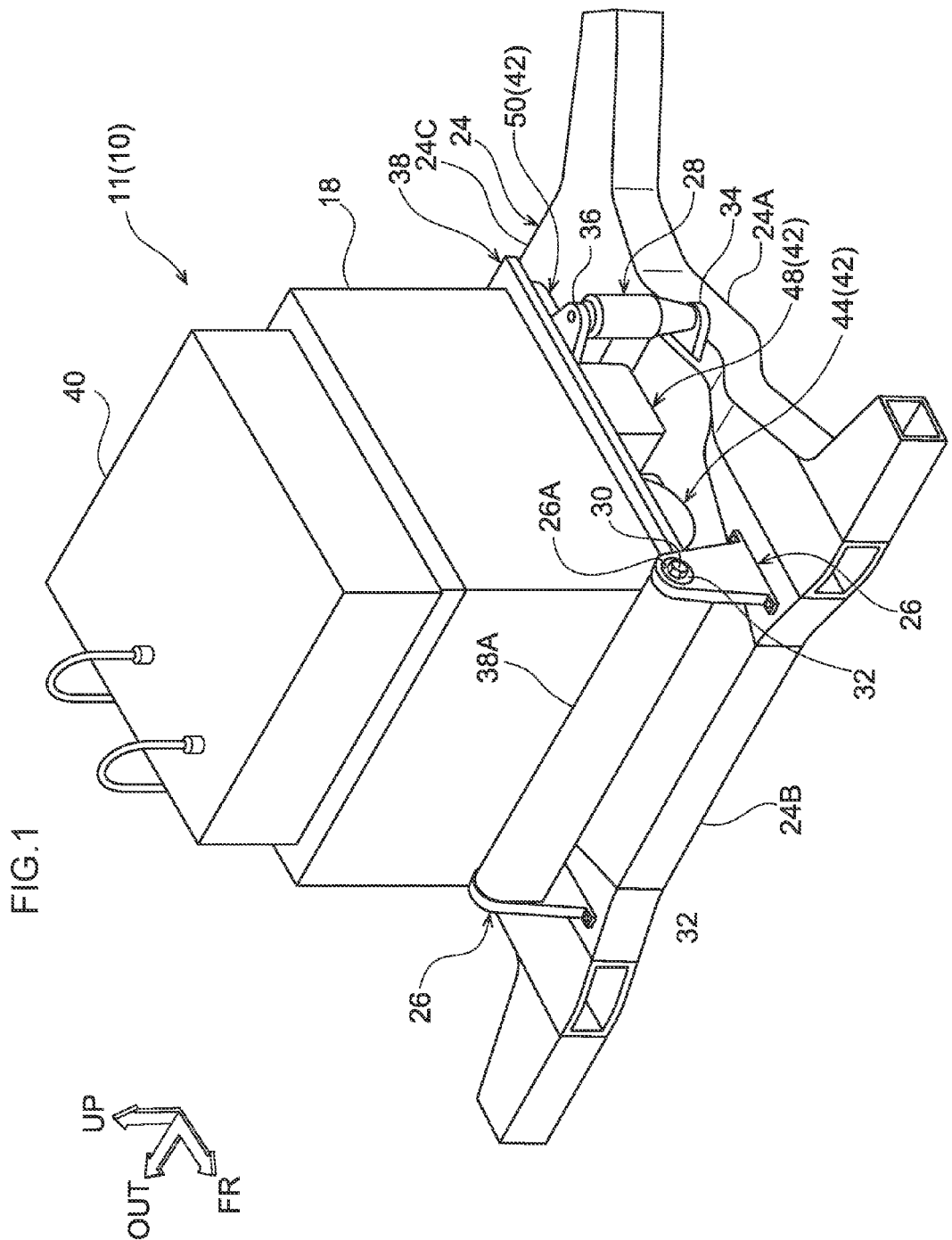
FIG. 1 is a perspective view showing a fuel cell mounting structure pertaining to the embodiment.

A fuel cell mounting structure pertaining to an embodiment of the present disclosure will be described in detail below based on the drawings. It should be noted that arrow FR appropriately shown in the drawings indicates a vehicle front direction, arrow UP indicates a vehicle upward direction, and arrow RH indicates a vehicle rightward direction when facing the traveling direction. Furthermore, when the directions of front and rear, up and down, and right and left are used without further specification in the following description, these will be understood to mean front and rear in the vehicle front and rear direction, up and down in the vehicle vertical direction, and right and left when facing the traveling direction.

(Overall Configuration of Vehicle)

Figure 4:
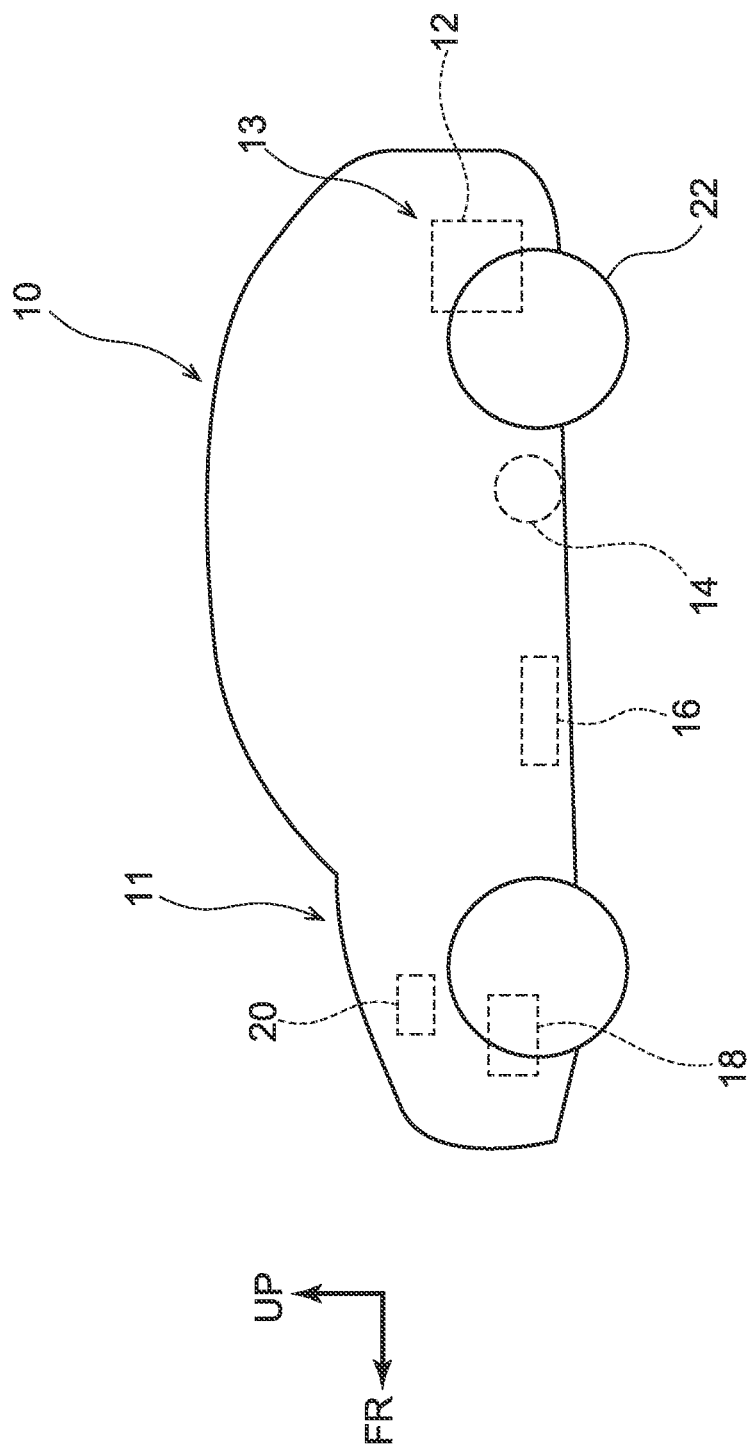
FIG. 4 is a schematic diagram showing a vehicle to which the fuel cell mounting structure pertaining to the embodiment has been applied.

As shown in FIG. 4, a vehicle 10 to which the fuel cell mounting structure pertaining to the present embodiment has been applied is formed to include a drive motor 12, a hydrogen cylinder 14, a storage battery 16, an FC stack 18 serving as a fuel cell, and a power control unit 20.

The drive motor 12 is placed in a vehicle rear portion 13. After the drive motor 12 is driven, the output from the drive motor 12 is transmitted via a transmission mechanism (not shown in the drawings) to rear wheels 22. Furthermore, the hydrogen cylinder 14 is disposed in the vehicle lower portion on the vehicle front side of the drive motor 12. The hydrogen cylinder 14 is a container filled with compressed hydrogen gas for supply to the later-described FC stack 18. It should be noted that although FIG. 1 shows only one hydrogen cylinder 14, the vehicle 10 is not limited to this and may also be equipped with plural hydrogen cylinders 14.

The storage battery 16 is disposed on the vehicle front side of the hydrogen cylinder 14. The storage battery 16 is a rechargeable battery, and in the present embodiment a nickel-hydrogen secondary battery, for example, is used. Additionally, the storage battery 16 supplies power to the drive motor 12 to drive the drive motor 12 and also recovers regenerative power from the drive motor 12 during regenerative braking. It should be noted that the storage battery 16 is not limited to a nickel-hydrogen secondary battery provided that the storage battery 16 is a rechargeable battery, and another battery may also be used. For example, a lithium-hydrogen secondary battery or a lead storage battery may also be used as the storage battery 16.

The FC stack 18 and the power control unit 20 are disposed in a power unit compartment in a vehicle front portion 11. The FC stack 18 has a stack structure where plural single cells that are constituent units are stacked, and the FC stack 18 functions as a high voltage power source. Additionally, each of the single cells configuring the FC stack 18 generates power by means of an electrochemical reaction between the hydrogen gas supplied from the hydrogen cylinder 14 and compressed air supplied from a later-described air compressor 48.

The power control unit 20 is equipped with an inverter that carries out conversion between the high voltage DC current handled in the FC stack 18 and the storage battery 16 and an AC current for driving the drive motor 12.

(Structure for Mounting FC Stack 18)

Next, a structure for mounting the FC stack 18 will be described. As shown in FIG. 1, the FC stack 18 is placed on the vehicle upper side of a suspension member 24. The suspension member 24 is placed in the lower portion of the vehicle front portion 11 and is supported by, and under, a right and left pair of front side members (not shown in the drawings) extending in the vehicle front and rear direction.

Furthermore, the suspension member 24 is equipped with a right and left pair of side rail portions 24A extending along the vehicle front and rear direction. The pair of side rail portions 24A extend in directions away from each other heading in the vehicle front direction. Additionally, front end portions of the pair of side rail portions 24A are interconnected by a front cross member 24B extending in the vehicle width direction, and rear end portions of the pair of side rail portions 24A are interconnected by a rear cross member 24C extending in the vehicle width direction. For this reason, the suspension member 24 is formed in a substantially frame shape as seen in a plan view seen from the vehicle upper direction. Here, plural anti-vibration members are attached to the side rail portions 24A. Specifically, front mount members 26 are attached to the front portions of the pair of side rail portions 24A, and rear mount members 28 are attached to the rear portions of the pair of side rail portions 24A.

The front mount members 26 are disposed in the sections of the side rail portions 24A connected to the front cross member 24B and are disposed standing on the side rail portions 24A in such a way that their plate thickness direction coincides with the vehicle width direction. Furthermore, insertion holes 26A are formed in the upper portions of the front mount members 26, and bolts 30 are inserted through the insertion holes 26A.

The bolts 30 are screwed into an upright portion 38A of a front end portion of a later-described stack frame 38, and the front mount members 26 are fastened by the bolts 30 to the stack frame 38. It should be noted that elastic bodies 32 are disposed between the bolts 30 and the holes walls of the insertion holes 26A and that the bolts 30 are attached via the elastic bodies 32 to the front mount members 26. For this reason, vibration that has been input from one of the suspension member 24 and the stack frame 38 to the other is damped by elastic deformation of the elastic bodies 32.

The rear mount members 28 are placed on the vehicle rear side of the front mount members 26. The rear mount members 28 are disposed in positions offset in the vehicle front direction from the sections of the side rail portions 24A connected to the rear cross member 24C, and the rear mount members 28 are formed in substantially round tubular shapes whose axial direction coincides with the vehicle vertical direction. Furthermore, the rear mount members 28 are placed between lower attachment pieces 34 disposed on the side rail portions 24A and upper attachment pieces 36 disposed on the later-described stack frame 38, and the rear mount members 28 interconnect the lower attachment pieces 34 and the upper attachment pieces 36 in the vehicle vertical direction.

The lower attachment pieces 34 are formed in substantially triangular shapes whose vehicle width direction outsides become apexes as seen in a plan view, and the lower attachment pieces 34 project outward in the vehicle width direction from the side rail portions 24A. Additionally, the lower end portions of the rear mount members 28 are attached to the projecting sections. The upper attachment pieces 36 are also formed in substantially triangular shapes whose vehicle width direction outsides become apexes as seen in a plan view, and the upper attachment pieces 36 project outward in the vehicle width direction from the stack frame 38. Additionally, the upper end portions of the rear mount members 28 are attached to the projecting sections.

For this reason, the rear mount members 28 are positioned on the vehicle width direction outsides of the side rail portions 24 and the stack frame 38. It should be noted that elastically deformable anti-vibration rubber is disposed inside the rear mount members 28, so that vibration that has been input from one of the suspension member 24 and the stack frame 38 to the other is damped.

A stack frame 38 that supports the FC stack 18 is attached to the pair of front mount members 26 and the pair of rear mount members 28. The stack frame 38 is formed in a substantially rectangular shape as seen in a plan view in such a way that its plate thickness direction coincides with the vehicle vertical direction. Furthermore, the upright portion 38A that projects in the vehicle upward direction is disposed on the front end portion of the stack frame 38, and bolt holes (no reference signs are assigned thereto) into which the bolts 30 are screwed are formed in the upright portion 38A. Moreover, as mentioned above, the upper attachment pieces 36 are attached to the rear portion of the stack frame 38, and the upper end portions of the rear mount members 28 are attached to the upper attachment pieces 36.

The FC stack 18 is secured to the upper surface of the stack frame 38 formed as described above. For this reason, the FC stack 18 is connected via the pair of front mount members 26 and the pair of rear mount members 28 to the suspension member 24. Furthermore, the FC stack 18 is formed in a substantially cuboid shape, and a DC-DC converter 40 is attached to the upper surface of the FC stack 18. The DC-DC converter 40 is electrically connected to the FC stack 18 and converts the voltage value of the DC current generated by the FC stack 18 to a different voltage value. It should be noted that although in the present embodiment only the DC-DC converter 40 is attached to the upper surface of the FC stack 18, the fuel cell mounting structure is not limited to this. For example, the fuel cell mounting structure may also have a configuration where an inverter that carries out conversion between a high voltage DC current and an AC current is attached instead of the DC-DC converter 40. Furthermore, the fuel cell mounting structure may also have a configuration where both the DC-DC converter 40 and an inverter are attached.

Figure 3:
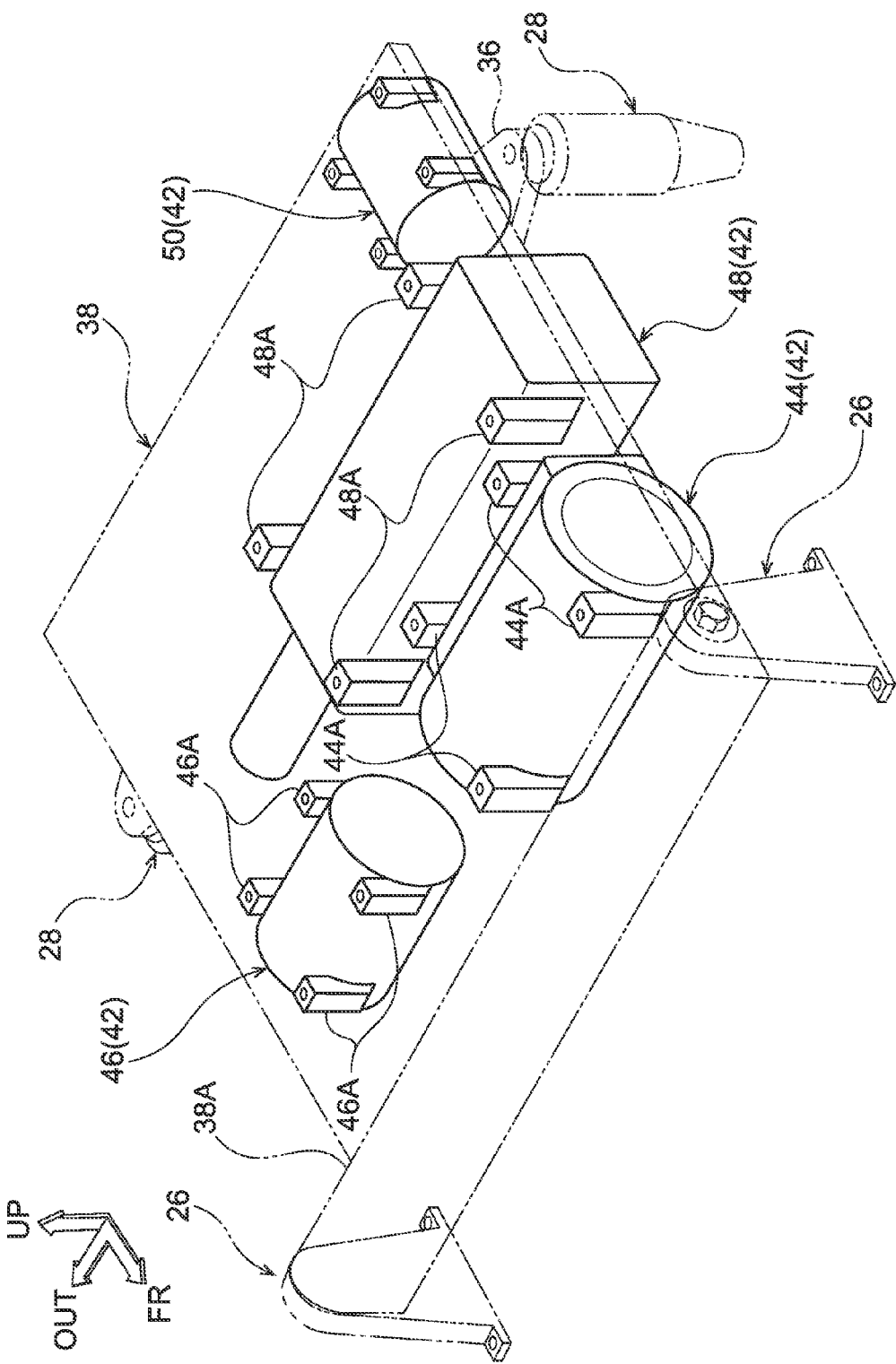
FIG. 3 is a perspective view for describing auxiliaries configuring the fuel cell mounting structure pertaining to the embodiment.

Here, auxiliaries 42 are attached to the undersurface of the stack frame 38. The auxiliaries 42 of the present embodiment will be described below with reference to FIG. 3. FIG. 3 shows a state in which the FC stack 18 and the suspension member 24 have been excluded, and for convenience of description the stack frame 38 is indicated by long dashed double-short dashed lines.

As shown in FIG. 3, the auxiliaries 42 of the present embodiment are formed to include an air conditioning system compressor 44, an FC water pump 46 serving as a pump, an air compressor 48, and a hydrogen pump 50.

The air conditioning system compressor 44 is attached to the undersurface of the front end portion and the left end portion of the stack frame 38, and is a compressor for compressing and liquefying refrigerant used in an air conditioning system. Additionally, piping (not shown in the drawings) configuring refrigerant flow paths are connected to the air conditioning system compressor 44.

Furthermore, plural (in the present embodiment, four) fastening portions 44A are disposed on the air conditioning system compressor 44. The fastening portions 44A project in the vehicle upward direction from the air conditioning system compressor 44 and are fastened to the stack frame 38 by fasteners such as bolts (not shown in the drawings). Moreover, the air conditioning system compressor 44 does not contact the suspension member 24. In other words, the air conditioning system compressor 44 is placed in a state of in which it does not contact the suspension member 24.

The FC water pump 46 is placed on the vehicle right side of the air conditioning system compressor 44. The FC water pump 46 is attached to the undersurface of the front end portion and the right end portion of the stack frame 38, and piping (not shown in the drawings) configuring cooling water flow paths are connected to the FC water pump 46. Additionally, the FC water pump 46 circulates the cooling water flowing through the piping to thereby cool and maintain the FC stack 18 at a predetermined temperature.

Furthermore, plural (in the present embodiment, four) fastening portions 46A are disposed on the FC water pump 46. The fastening portions 46A project in the vehicle upward direction from the FC water pump 46 and are fastened to the stack frame 38 by fasteners such as bolts (not shown in the drawings). Moreover, the FC water pump 46 does not contact the suspension member 24. In other words, the FC water pump 46 is placed in a state in which it does not contact the suspension member 24.

The air compressor 48 is placed on the vehicle rear side of the air conditioning system compressor 44. The air compressor 48 is attached to the undersurface of the vehicle front and rear direction middle section of the stack frame 38, and a piping for supplying compressed air to the FC stack 18 is connected to the air compressor 48.

Furthermore, plural (in the present embodiment, four) fastening portions 48A are disposed on the air compressor 48. The fastening portions 48A project in the vehicle upward direction from the air compressor 48 and are fastened to the stack frame 38 by fasteners such as bolts (not shown in the drawings). Moreover, the air compressor 48 does not contact the suspension member 24. In other words, the air compressor 48 is placed in a state in which it does not contact the suspension member 24.

The hydrogen pump 50 is placed on the vehicle rear side of the air compressor 48. The hydrogen pump 50 is attached to the undersurface of the rear end portion and the left end portion of the stack frame 38, and piping (not shown in the drawings) configuring hydrogen flow paths are connected to the hydrogen pump 50. Additionally, unreacted hydrogen gas discharged from the FC stack 18 is circulated by the hydrogen pump 50 and is thereby supplied back to the FC stack 18.

Furthermore, plural (in the present embodiment, four) fastening portions 50A are disposed on the hydrogen pump 50. The fastening portions 50A project in the vehicle upward direction from the hydrogen pump 50 and are fastened to the stack frame 38 by fasteners such as bolts (not shown in the drawings). Moreover, the hydrogen pump 50 does not contact the suspension member 24. In other words, the hydrogen pump 50 is placed in a state in which it does not contact the suspension member 24.

Figure 2:
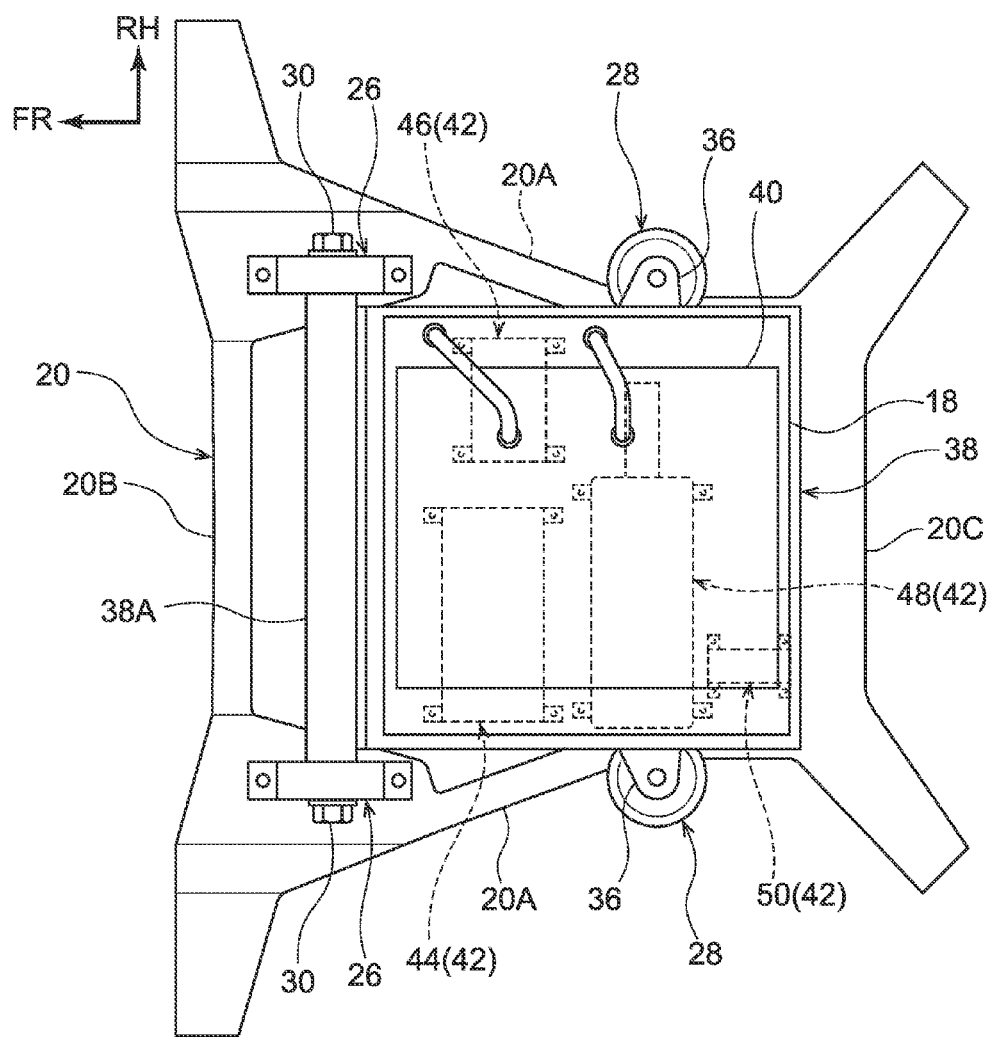
FIG. 2 is a plan view showing the fuel cell mounting structure pertaining to the embodiment.

As described above, the auxiliaries 42 in the present embodiment are attached to the undersurface of the stack frame 38 in a state in which the auxiliaries 42 do not contact the suspension member 24. Furthermore, as shown in FIG. 2, the air conditioning system compressor 44, the FC water pump 46, the air compressor 48, and the hydrogen pump 50 that configure the auxiliaries 42 are placed in positions where they are hidden by the stack frame 38 as seen from the vehicle upper direction. That is, they are placed inside the outline of the stack frame 38. It should be noted that "placed in positions where they are hidden by the stack frame 38" is not limited to a state in which the parts configuring the auxiliaries 42 are completely hidden and cannot be seen from the vehicle upper direction. The concept includes a configuration where, for example, portions of the parts configuring the auxiliaries 42 are positioned slightly outside the outline of the stack frame 38 to the extent that they do not interfere with the suspension member 24.

(Operation)

Next, the operation of the fuel cell mounting structure of the present embodiment will be described.

In the fuel cell mounting structure pertaining to the present embodiment, the stack frame 38 that supports the FC stack 18 is placed on the vehicle upper side of the suspension member 24. Additionally, the stack frame 38 is connected via the pair of front mount members 26 and the pair of rear mount members 28 to the suspension member 24. Furthermore, the auxiliaries 42 are attached to the undersurface of the stack frame 38. In this way, by attaching the auxiliaries 42 via the stack frame 38 to the heavy-weight FC stack 18, vibration generated by the auxiliaries is damped as a result of being transmitted to the FC stack 18, and vibration transmitted from the auxiliaries 42 to the vehicle body can be suppressed. As a result, in-cabin noise caused by the vibration of the auxiliaries 42 can be reduced.

Furthermore, in the event of a collision to the vehicle 10, some of the collision load that has been input to the suspension member 24 is absorbed by the pair of front mount members 26 and the pair of rear mount members 28. Because of this, the collision load can be kept from being transmitted to the FC stack 18.

Moreover, in a rear-wheel-drive fuel cell vehicle where the drive motor 12 is placed in the vehicle rear portion 13, an increase in costs associated with the wires and piping of the auxiliaries 42 can be suppressed compared to a configuration where the auxiliaries 42 are attached to the drive motor 12 to damp vibration. That is, in the structure of the comparative example where the auxiliaries 42 are attached to the drive motor 12 in the vehicle rear portion 13, the wires and piping connecting the auxiliaries 42 to the radiator, condenser, and so forth placed in the vehicle front portion become longer, and there is the potential for costs to increase in correspondence thereto. In contrast, by employing a configuration where the FC stack 18 is placed in the vehicle front portion 11 and the auxiliaries 42 are attached to the FC stack 18 as in the present embodiment, the wires and piping do not have to be made longer. That is, vibration of the auxiliaries 42 can be damped while suppressing an increase in costs associated with the wires and piping of the auxiliaries 42.

Furthermore, in the present embodiment, in addition to the auxiliaries for the fuel cell vehicle (the FC water pump 46, the air compressor 48, and the hydrogen pump 50), the air conditioning system compressor 44 is attached to the undersurface of the stack frame 38. Furthermore, the DC-DC converter 40 is attached to the upper surface of the FC stack 18. Because of this, dedicated anti-vibration members for damping vibration generated by the air conditioning system compressor 44 and the DC-DC converter 40 become unnecessary. In other words, vibration generated by the air conditioning system compressor 44 and high frequencies generated by the DC-DC converter 40 can be damped without using dedicated anti-vibration members, and in-cabin noise caused by the vibration and high frequencies can be reduced.

Moreover, in the present embodiment, as shown in FIG. 2, the auxiliaries 42 are placed in positions where they are hidden by the stack frame 38 as seen from the vehicle upper direction. Because of this, even in the case of appropriating parts such as a suspension member and a chassis of a conventional vehicle whose only drive source is an engine, the auxiliaries 42 can be kept from interfering with these parts. As a result, parts can be shared with those of a conventional vehicle, and parts costs and manufacturing costs can be reduced.

The fuel cell mounting structure pertaining to the embodiment of the present disclosure has been described above, but naturally it can be implemented in a variety of ways without departing from the spirit of the present disclosure. For example, in the embodiment, four parts—the air conditioning system compressor 44, the FC water pump 46, the air compressor 48, and the hydrogen pump 50—are attached to the stack frame 38, but the fuel cell mounting structure is not limited to this. The fuel cell mounting structure may also have a configuration where only the air compressor 48 and the FC water pump 46 are attached to the undersurface of the stack frame 38. In this case also, vibration generated by the air compressor 48 and the FC water pump 46 can be damped by the FC stack 18. That is, compared to a configuration where the auxiliaries 42 are attached in another location, vibration of the auxiliaries 42 can be damped while suppressing an increase in costs associated with the wires and piping of the auxiliaries 42.

Furthermore, in the present embodiment, the auxiliaries 42 are attached via the stack frame 38 to the FC stack 18, but the fuel cell mounting structure is not limited to this. For example, the auxiliaries 42 may also be directly attached to the FC stack 18 using brackets or the like. Furthermore, the fuel cell mounting structure may also employ a configuration where attachment holes or the like for attaching the auxiliaries 42 are formed beforehand in a case configuring the outer shell of the FC stack 18.

Moreover, in the present embodiment, the stack frame 38 is connected via four mount members—the pair of front mount members 26 and the pair of rear mount members 28—to the suspension member 24, but the fuel cell mounting structure is not limited to this. For example, the stack frame 38 may also be connected to the suspension member 24 by three mount members. As an example of this, the fuel cell mounting structure may have a configuration where the front end portion of the stack frame 38 is supported by one front mount member 26 instead of the pair of front mount members 26. In this case, by arranging the front mount member 26 in consideration of the load acting on the right side and the load acting on the left side of the stack frame 38, the stack frame 38 and the FC stack 18 can be supported by three mount members.

Moreover, the sizes and shapes of the air conditioning system compressor 44, the FC water pump 46, the air compressor 48, and the hydrogen pump 50 described in the embodiment are not particularly limited and may also be different sizes and different shapes. Furthermore, the numbers and shapes of the fastening portions disposed on each of these parts are also not particularly limited.

What is claimed is:

1. A fuel cell mounting structure comprising:
    a fuel cell which is configured to be disposed in a vehicle where a drive motor that drives rear wheels is placed in a vehicle rear portion, the fuel cell placed on the vehicle upper side of a suspension member disposed in a vehicle front portion and connected via a plurality of anti-vibration members to the suspension member; and
    auxiliaries that are attached to the fuel cell in a state in which the auxiliaries do not contact the suspension member and include at least an air compressor and a pump,
    wherein the anti-vibration members are connected to a stack frame that supports the fuel cell and are attached to front and rear portions of the suspension member, and at least the anti-vibration members attached to the rear portion of the suspension member are positioned on a vehicle width direction outsides of the stack frame.

2. The fuel cell mounting structure according to claim 1, wherein an air conditioning system compressor is attached to the fuel cell in a state in which the air conditioning system compressor does not contact the suspension member.

3. The fuel cell mounting structure according to claim 1, wherein at least one of a DC-DC converter or an inverter is attached to the fuel cell in a state in which the at least one of the DC-DC converter or the inverter does not contact the suspension member.

4. The fuel cell mounting structure according to claim 1, wherein the auxiliaries are placed in positions where they are completely hidden by the stack frame as seen from the vehicle upper direction.

5. The fuel cell mounting structure according to claim 1, wherein the auxiliaries are attached via the stack frame to the fuel cell and are placed in positions where they are hidden by the stack frame as seen from the vehicle upper direction.

* * * * *